UNITED STATES PATENT OFFICE.

EDWARD D. KENDALL, OF BROOKLYN, NEW YORK, ASSIGNOR TO EDWARD D. KENDALL AND EDWARD N. DICKERSON, OF STOVALL, NORTH CAROLINA.

PROCESS OF GENERATING CHLORIN AND TREATING ORES WITH SAME.

SPECIFICATION forming part of Letters Patent No. 681,059, dated August 20, 1901.

Application filed April 12, 1901. Serial No. 55,443. (No specimens.)

*To all whom it may concern:*

Be it known that I, EDWARD D. KENDALL, of the borough of Brooklyn, in the city and State of New York, have invented a new and useful Process of Generating Chlorin and Treating Ores with the Same, of which the following is a full, true, and exact description.

This invention relates to processes for generating chlorin and treating ores with the same, particularly ores of the precious metals; and the object of my invention is to render the use of chlorin for the purpose stated economical, convenient, and safe.

The usual method of generating chlorin for the treatment of ores is by the action of sulfuric acid on a chlorin-yielding mixture or compound, such as manganese dioxid, common salt and water, or crude commercial calcium hypochlorite, known as "chlorid of lime," and water. This use of sulfuric acid is not only attended with inconvenience and some danger, but involves excessive outlay for the acid-containing vessels and for transportation to mines. Similar disadvantages attend the use of compressed and liquefied chlorin.

My improved process consists in generating chlorin in contact with or for use on ore from a suitable chlorin-containing compound—such as the aforesaid mixture of manganese dioxid, water, common salt, or chlorid of lime and water—by adding to the same a solid acid compound which I prepare by the method now to be described. I take, preferably, hydrogen sodium sulfate, the formula of which may be regarded as $NaHSO_4$ or $Na_2SO_4.H_2SO_4$, and crush or granulate the same and add thereto sulfuric acid, preferably monohydrated sulfuric acid (66° Baumé) and apply heat until the said salt is melted and incorporated with the added sulfuric acid. I then pour this hot liquid into molds of metal or other material of any required form, when rapid solidification occurs. The proportionate quantity of sulfuric acid to be so added is not necessarily exact, but should not be so great as to prevent the formation of a body solid at ordinary temperatures. A typical sample of this solid would have this composition represented by the formula $Na_2SO_4.2H_2SO_4$. This solid may be handled with impunity. It will be referred to herein as "acid salt."

In applying my process to so-called "barrel chlorination" (in which chlorin is to be generated within a closed receptacle and in contact with the ore, thereby obtaining the advantages of pressure and of the chlorin acting to a greater or less extent in the nascent state) I charge the barrel with the pulverized or granulated ore, add thereto the requisite quantity of chlorid of lime, and thoroughly mix the chlorid of lime with the ore by rotating the closed barrel. Water is to be added before or after this mixing rotation. A proper quantity of the before-described acid salt in solid cakes or lumps is then to be added to the mixture of ore, water, and chlorid of lime and the closed barrel rotated until the chemical action taking place within is sufficiently advanced or completed. One advantage in this method of procedure is that the chlorin is not generated violently, as when liquid sulfuric acid is used, but slowly, steadily, and with opportunity for the chlorin to act in *statu nascendi*. The chlorination completed, the contents of the barrel are to be removed by the well-known means and the liquid separated from the ore by filtration and washing in the usual way.

When so preferred, the acid salt may be added to the ore and water before adding the chlorid of lime, or both the chlorid of lime and acid salt may be added at the same time, but advantage accrues from prior thorough mixing of the chlorid of lime with the ore.

Manganese dioxid and common salt may be substituted for the chlorid of lime in the combination with the said acid salt in operations for the production of chlorin for treating ores without departing from my invention.

Of course sodium sulfate, $Na_2SO_4$, may be used as the starting-point in preparing the said acid salt, in which case additional equivalents of sulfuric acid are to be used. A cheap available material to be used for conversion into the acid salt is the crude residue of the acid-works, known as "salt cake."

Potassium sulfates may be used instead of the corresponding sodium salts; but the latter are of course much cheaper than any other alkali-metal sulfates.

What I claim as my invention, and desire to secure by Letters Patent, is—

1. The process of treating ores containing precious metals, which consists in subjecting them to the action of the acid salt herein described, having the formula $Na_2SO_4,2H_2,SO_4$ and a chlorin-containing body, substantially as described.

2. The process of treating ores containing precious metals, which consists in treating them with the acid salt having the formula $Na_2SO_4.2H_2SO_4$ and chlorid of lime and water, in a closed receptacle, substantially as described.

In testimony whereof I have signed my name to this specification in the presence of two subscribing witnesses.

EDWARD D. KENDALL.

Witnesses:
GEO. E. CRUSE,
DONALD CAMPBELL.